United States Patent
Hill et al.

(10) Patent No.: US 7,143,242 B2
(45) Date of Patent: Nov. 28, 2006

(54) DYNAMIC PRIORITY EXTERNAL TRANSACTION SYSTEM

(75) Inventors: David L. Hill, Cornelius, OR (US); Derek T. Bachand, Portland, OR (US); Chinna B. Prudvi, Portland, OR (US); Deborah T. Marr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/667,457

(22) Filed: Sep. 23, 2003

(65) Prior Publication Data

US 2004/0059854 A1    Mar. 25, 2004

Related U.S. Application Data

(63) Continuation of application No. 09/474,011, filed on Dec. 28, 1999, now Pat. No. 6,654,837.

(51) Int. Cl.
*G06F 12/00*    (2006.01)

(52) U.S. Cl. ........................ 711/137; 710/244

(58) Field of Classification Search ............... None
See application file for complete search history.

(56) References Cited

U.S. PATENT DOCUMENTS

| | | | | |
|---|---|---|---|---|
| 4,208,714 A | | 6/1980 | Eklund et al. | 364/200 |
| 5,056,041 A | * | 10/1991 | Guttag et al. | 345/563 |
| 5,230,078 A | * | 7/1993 | Varele et al. | 455/67.1 |
| 5,442,755 A | * | 8/1995 | Shibata | 710/108 |
| 5,724,613 A | | 3/1998 | Wszolek | 395/853 |
| 5,761,452 A | | 6/1998 | Hooks et al. | 395/296 |
| 5,937,205 A | | 8/1999 | Mattson et al. | 395/826 |
| 6,148,372 A | * | 11/2000 | Mehrotra et al. | 711/122 |
| 6,286,074 B1 | * | 9/2001 | Batchelor et al. | 710/305 |
| 6,330,647 B1 | * | 12/2001 | Jeddeloh et al. | 711/158 |
| 6,341,335 B1 | * | 1/2002 | Kanai et al. | 711/137 |
| 6,401,212 B1 | * | 6/2002 | Bondi et al. | 713/340 |
| 6,446,143 B1 | * | 9/2002 | Razdan et al. | 710/29 |
| 6,470,427 B1 | * | 10/2002 | Arimilli et al. | 711/137 |
| 6,484,239 B1 | * | 11/2002 | Hill et al. | 711/137 |
| 6,553,446 B1 | * | 4/2003 | Miller | 710/307 |
| 6,920,512 B1 | * | 7/2005 | Steinman et al. | 710/100 |

OTHER PUBLICATIONS

Culler et al. "Parallel Computer Architecture", 1999, Morgan Kaufmann, p. 879-883.*

* cited by examiner

*Primary Examiner*—Mano Padmanabhan
*Assistant Examiner*—Paul Baker
(74) *Attorney, Agent, or Firm*—Kenyon & Kenyon LLP

(57) ABSTRACT

A multi-mode transaction queue may operate according to a default priority scheme. When a congestion event is detected, the transaction queue may engage a second priority scheme.

31 Claims, 3 Drawing Sheets

100

200

300

1000

DYNAMIC PRIORITY EXTERNAL TRANSACTION SYSTEM

RELATED APPLICATIONS

The present application is a continuation of U.S. patent application Ser. No. 09/474,011 filed on Dec. 28, 1999, now U.S. Pat. No. 6,654,837.

BACKGROUND

As is known, many modern computing systems employ a multi-agent architecture. A typical system is shown in FIG. 1. There, a plurality of agents 110–160 communicates over an external bus 170 according to a predetermined bus protocol. "Agents" may include general-purpose processors 110–140, memory controllers 150, interface chipsets 160, input output devices and/or other integrated circuits that process data requests (not shown). The bus 170 may permit several external bus transactions to be in progress at once.

An agent (e.g., 110) typically includes a transaction management system that receives requests from other components of the agent and processes external bus transactions to implement the requests. A bus sequencing unit 200 ("BSU"), shown in FIG. 2, is an example of one such transaction management system. The BSU 200 may include an arbiter 210, an internal cache 220, an internal transaction queue 230, an external transaction queue 240, an external bus controller 250 and a prefetch queue 260. The BSU 200 manages transactions on the external bus 170 in response to data requests issued by, for example, an agent core (not shown in FIG. 2).

The arbiter 210 may receive data requests not only from the core but also from a variety of other sources such as the prefetch queue 260. Of the possibly several data requests received simultaneously by the arbiter 210, the arbiter 210 may select and output one of them to the remainder of the BSU 200.

The internal cache 220 may store data in several cache entries. It may possess logic responsive to a data request to determine whether the cache 220 stores a valid copy of requested data. "Data," as used herein, may refer to instruction data and variable data that may be used by the agent. The internal cache 220 may furnish requested data in response to data requests.

The internal transaction queue 230 also may receive and store data requests issued by the arbiter 210. For read requests, it coordinates with the internal cache 220 to determine if the requested data "hits" (may be furnished by) the internal cache 220. If not, if a data request "misses" the internal cache 220, the internal transaction queue 230 forwards the data request to the external transaction queue 240.

The external transaction queue 240 may interpret data requests and generate external bus transactions to fulfill them. The external transaction queue 240 may be populated by several queue registers. It manages the agent's transactions as they progress on the external bus 170. For example, when data is available in response to a transaction, the external transaction queue 240 retrieves the data and forwards it to a requester within the agent (for example, the core).

The prefetch queue 260 may identify predetermined patterns in read requests issued by the core (not shown). For example, if the core issues read requests directed to sequentially advancing memory locations (addresses A, A+1, A+2, A+3, . . . ) the prefetch queue 260 may issue a prefetch request to read data from a next address in the sequence (A+4) before the core actually requests the data itself. By anticipating a need for data, the prefetch queue 260 may cause the data to be available in the internal cache 220 when the core issues a request for the data. The data would be furnished to the core from the internal cache 220 rather than from external memory—a much faster operation. Herein, this type of prefetch request is called a "patterned prefetch."

A BSU 200 may implement a second type of prefetch, herein called a "blind prefetch." When a core issues a read request to data at an address (say, address B) that will be fulfilled by an external bus transaction, a blind prefetch mechanism may cause a second external bus transaction to retrieve data at a second memory address (B+1). A blind prefetch may cause every read request from a core that cannot be fulfilled internally to spawn a pair of external bus transactions. Blind prefetches may improve processor performance by retrieving twice as many cache lines (or cache sectors) as are necessary to satisfy the core read request. Again, if the core eventually requires data from the data prefetched from the other address (B+1), the data may be available in the internal cache 220 when the core issues a read request for the data. A blind prefetch request also may be generated from a patterned prefetch request. Using the example above, a patterned prefetch request to address A+4 may be augmented by a blind prefetch to address A+5.

Returning to FIG. 1, it is well known that, particularly in multiprocessor computer systems, the external bus 170 can limit system performance. The external bus 170 often operates at clock speeds that are much slower than the internal clock speeds of the agents. A core often may issue several requests for data in the time that the external bus 170 can complete a single external bus transaction. Thus, a single agent can consume much of the bandwidth of an external bus 170. When a plural number of agents must share the external bus 170, each agent is allocated only a fraction of the bandwidth available on the bus 170. In multiple agent systems, agents very often must wait idle while an external bus retrieves data that they need to make forward progress.

An external transaction queue 240 (FIG. 2) may include control logic that prioritizes pending requests for posting to the external bus. Generally, core reads should be prioritized over prefetch reads and prefetch reads should be prioritized over writes. Core read requests identify data for which the core has an immediate need. Prefetch read requests identify data that the core is likely to need at some point in the future. Write requests identify data that the agent is returning to system storage. Accordingly, the external transaction queue 240 may include control logic that posts requests on the external bus according to this priority.

The predetermined priority scheme has its disadvantages. A request typically is stored in the transaction queue 240 until it is completed on the external bus. During periods of high congestion, when the transaction queue 240 is entirely or nearly full, prefetch and write requests may prevent new core requests from being stored in the queue 240. These lower priority requests would remain stored in the queue until an external bus transaction for the request completes. Thus, the lower priority requests may prevent higher priority requests from being implemented. This would limit system performance.

Accordingly, there is a need in the art for a congestion management system for an external transaction queue in an agent. There is a need in the art for such a system that provides a dynamic priority system—maintaining a first priority scheme in the absence of system congestion but implementing a second priority when congestion events occur.

SUMMARY

Embodiments of the present invention provide a multi-mode transaction queue for an agent. The transaction queue may operate according to a default priority scheme. When a congestion event is detected, the transaction queue may engage a second priority scheme.

DETAILED DESCRIPTION

Embodiments of the present invention provide a transaction queue that provides a measured response to congestion events. The transaction queue selectively invalidates stored transactions in the queue that are pending—they are not currently posted to the external bus. In one embodiment, the transaction queue invalidates blind prefetch requests first. The transaction queue may also invalidate non-posted prefetch requests that are stored with an associated posted prefetch request. Finally, in an extreme congestion case, as when there is no available room for new requests, the transaction queue may invalidate a pair of non-posted patterned prefetch requests.

These embodiments advantageously provide a transaction queue having a dynamic priority scheme. In the absence of congestion, the transaction queue may operate in accordance with a first priority scheme. For example, the transaction queue may prioritize core read requests over prefetch requests and may prioritize prefetch requests over write requests as is discussed above. When congestion events occur, however, the transaction queue may engage a second priority scheme. For example, the transaction queue may maintain core read requests as highest priority requests and reprioritize write requests as the next-highest priority requests. The transaction queue may invalidate prefetch requests that are stored in the transaction queue.

Figure 3:
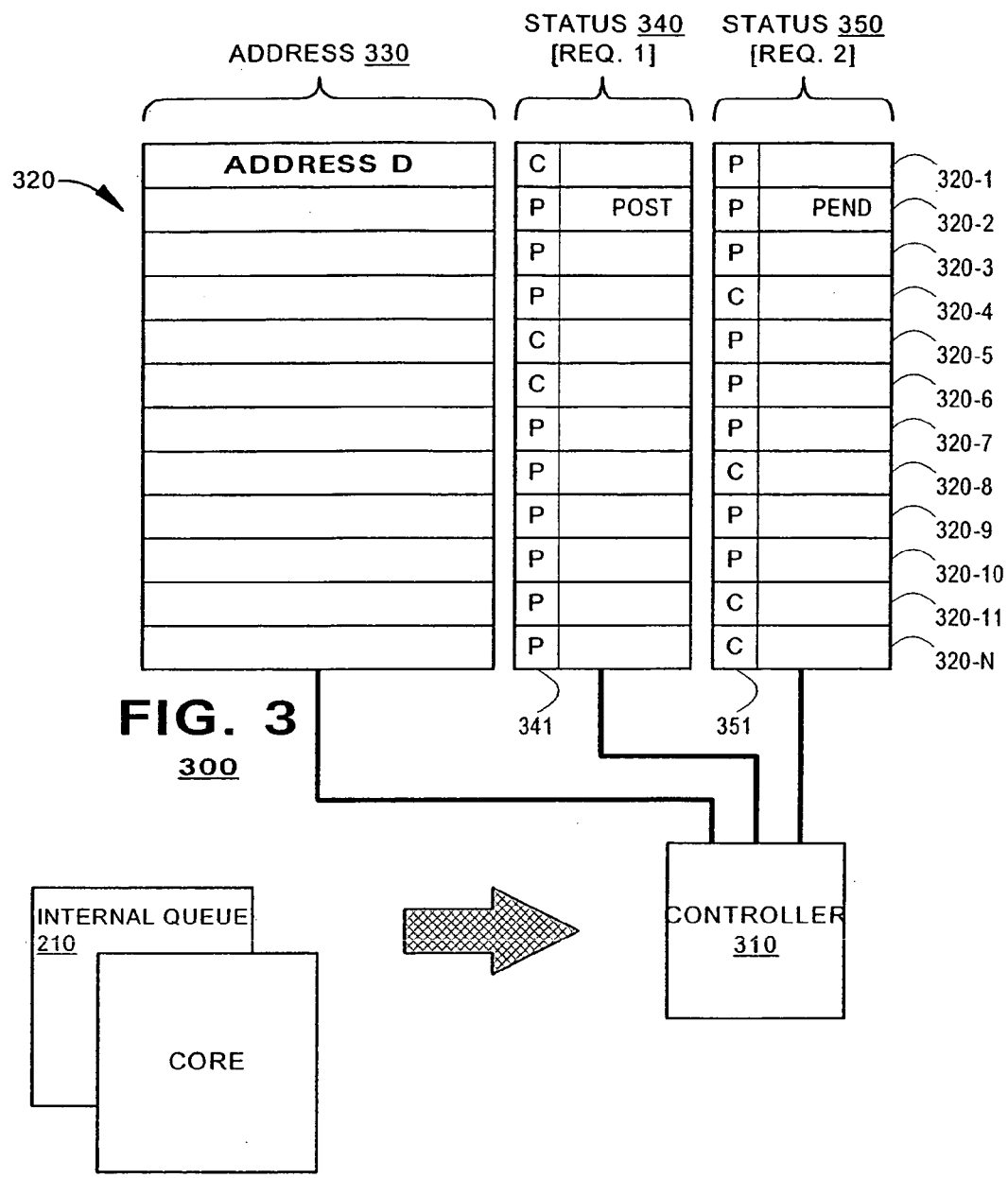
FIG. 3 is a block diagram of an external transaction queue of an agent according to an embodiment of the present invention.

FIG. 3 is a block diagram of an external transaction queue 300 of an agent according to an embodiment of the present invention. The external transaction queue 300 may include a controller 310 and a plurality of queue registers 320-1 through 320-N (labeled 320 collectively). Each queue register may be populated by several fields including an address field 330, a first status field 340 and a second status field 350.

The external transaction queue 300 may be appropriate for use in agents that perform blind prefetches. The status fields 340, 350 each may store information about a respective one of the external bus transactions that will be performed according to the blind prefetch pair. The address field 330 may store a base address to which the transactions will be directed. Typically there will be a predetermined relationship between the address field 330 and the status fields 340, 350. For example, if an address D is stored the address field 330 of register 320-1, status field 340 may maintain status information about a transaction directed to address D and status field 350 may maintain status information about a second transaction directed to address D+1.

The status fields 340, 350 may store administrative information regarding the respective transactions. Such information may include a request type, information regarding the respective transaction's status on the external bus (i.e., whether it has been posted, which transaction stage the request may be in, whether the transaction is completed, etc.) and information regarding a destination of data that may be received pursuant to the transaction. Typically, a transaction is cleared from a register 320 when the status fields 340, 350 both indicate that their respective transactions have completed.

According to an embodiment of the present invention, the status fields 340, 350 each may include a sub-field that identifies whether the corresponding transaction is generated pursuant to a core request ("C") or pursuant to a prefetch request ("P"). FIG. 3 illustrates an example where seven requests are core requests and the remainder are prefetch requests. In this example, the transactions stored in registers 320-1, 320-4, 320-5, 320-6, 320-8, 320-11 and 320-N store transactions that were initiated by a core requests. One of the status fields 340 or 350 of those registers identify the transaction as originating from a core request; the other status field indicates a blind prefetch requests.

The other registers 320-2, 320-3, 320-7, 320-9 and 320-10 identify patterned prefetch requests augmented by blind prefetches. Both of the status fields 340, 350 indicate that the requests are prefetch requests.

Figure 1:
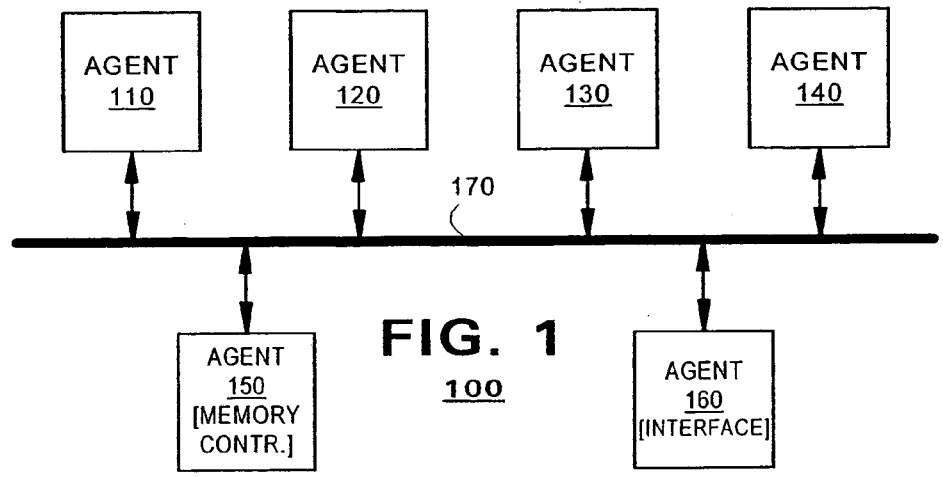
FIG. 1 is a block diagram of a multi-agent computer system.
Figure 2:
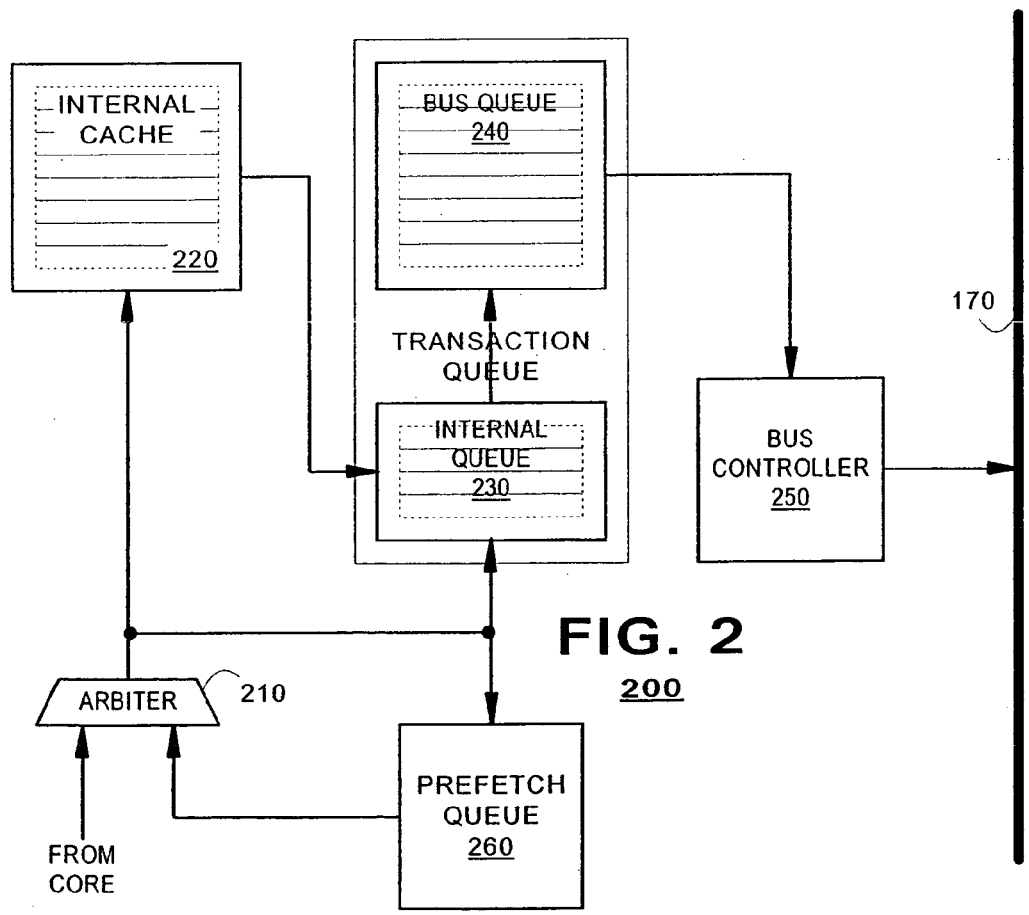
FIG. 2 is a block diagram of an exemplary bus sequencing unit of an agent.

The controller 310 interfaces the external transaction queue 300 to other elements within the agent (See, for example, FIG. 2). The controller 310 may cause transactions to be entered or removed from the queue registers 320 and may write data into the address field 330 and to the status fields 340, 350. The controller 310 also may schedule an order for transactions to be posted on the external bus 170 (FIG. 1). In one embodiment, the controller 310 may be a state machine.

According to an embodiment of the present invention, the controller 310 may selectively disable prefetch requests during congestion events within the BSU 200. In a first embodiment, when the transaction queue 300 experiences congestion, the transaction queue may disable any blind prefetch transactions that have not been posted on the external bus. This may be accomplished, for example, by marking the status field of the blind prefetch transaction as completed even though the transaction was never posted. In this embodiment, when the core read request is completed on the external bus, the transaction may be evicted from the transaction queue 300.

In another embodiment, when the transaction queue experiences congestion, the transaction queue 300 may evict any patterned prefetch request stored in the queue that has not been posted on the external bus. The transaction queue 300 may evict non-started prefetch requests simply by de-allocating the associated queue register.

In a further embodiment, when the transaction queue experiences congestion and the transaction queue 300 stores patterned prefetch transactions that have been started, the transaction queue 300 may disable any non-posted prefetch transaction in the prefetch pair. Consider the patterned prefetch request illustrated in register 320-2 of FIG. 3. As shown, the status field 350 indicates that the first prefetch transaction is pending but has not been posted on the external bus. By contrast, the status field 340 indicates that the second prefetch transaction has been posted on the external bus. In this embodiment, the transaction queue 300 may mark the first transaction as completed in response to a congestion event. In this case, the second prefetch request would be permitted to continue to completion. When it completed, the transaction queue 300 could de-allocate register 320-2 because both status fields 340, 350 identify completed transactions.

Figure 4:
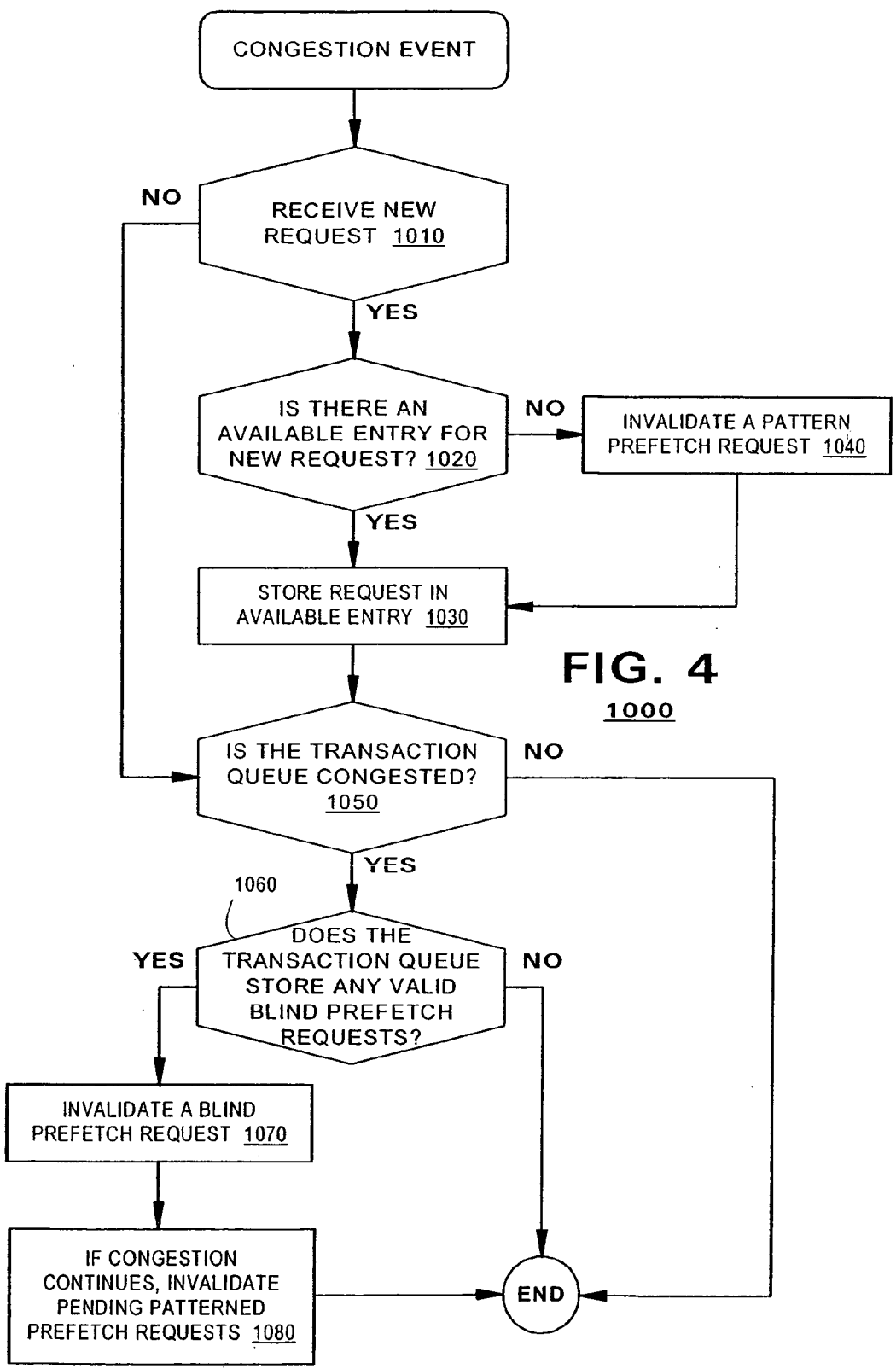
FIG. 4 is a flow diagram of a congestion management method according to an embodiment of the present invention.

FIG. 4 is a flow diagram of a method 1000 that may be performed by the transaction queue 300 (FIG. 3) according to an embodiment of the present invention. Upon a congestion event, the transaction queue may determine whether a new request is input to the transaction queue (Step 1010). Upon receipt of a new request, the transaction queue may determine whether a register is available for the new request (Step 1020). If so, it stores the request in an available register (Step 1030). Storage of requests may be performed according to conventional methods in the art. The transaction queue 300 may determine a base address of the request and enter appropriate information in the various fields 330-350 of the allocated register.

If at step 1020 there was no register available, then the transaction queue 300 may de-allocate a register associated with a pair of non-posted patterned prefetch requests (Step 1040). In performance of this step, the transaction queue 300 may de-allocate a patterned prefetch request for which both status fields 340, 350 indicate that the respective transactions have not been posted to the external bus. If none of the registers 320 identify a pair of prefetch requests that are not started, then the newly received request may be stalled (step not shown). The request is prevented from entering the transaction queue.

At the conclusion of step 1030 or if there was no received request at step 1010, the transaction queue determines whether it is operating in a congested mode (Step 1050). If not, the transaction queue 300 may cease this iteration of the method 1000.

If the transaction queue 300 is operating in a congested mode, the transaction queue determines whether it stores any pending blind prefetch transactions (Step 1060). If so, the transaction queue 300 may disable one of the blind prefetch transactions (Step 1070). Step 1070 may apply to blind prefetches associated with a core request or a patterned prefetch request. If not, or at the conclusion of Step 1070, the method may conclude.

The method 1000 advantageously provides a measured response to congestion. As a first response, the transaction queue invalidates blind prefetch requests from the transaction queue. As discussed above, prefetch requests as a class are subordinated to core requests. Experience also teaches that it is appropriate to subordinate blind prefetches to patterned prefetches. Patterned prefetches are likely to be more efficient than blind prefetches. Patterned prefetches are issued in response to an established pattern of core reads from memory. Blind prefetches are not tied to any kind of measurable indicia. Thus, patterned prefetches may be more likely to retrieve data that the core eventually will request and should be retained in favor of blind prefetches.

When a blind prefetch is invalidated, it increases the rate at which registers 320 will be made available for use to newly received requests. As noted, blind prefetches are associated with core read requests. Core read requests are the highest priority request that is handled by the transaction queue—they are posted on the external bus at the highest priority.

At a second level of priority, if the congestion continues even after all blind prefetches have been invalidated, the transaction queue may invalidate pending patterned prefetch requests that are associated with in-progress prefetch requests (Step 1080). Because one of the prefetch requests has already been posted to the external bus, it is likely to conclude in a predetermined amount of time. However, even if it concluded the status of the second pending prefetch request (the one that is invalidated in step 1080) would prevent the associated register from being de-allocated. Step 1080, by marking the pending prefetch request as completed, ensures that a register will be de-allocated when the posted prefetch request concludes.

At a third level of priority, the transaction queue de-allocates a register that stores a pair of pending prefetch requests in favor of a newly received request. This occurs only when there are no registers available to the newly received request.

The principles of the present invention permit several different triggering events to cause the transaction queue 300 to decide that it is operating in a congested mode. In a first embodiment, the transaction queue 300 may determine that it is congested based on a number of allocated or unallocated registers 320 in the queue. For example, if the transaction queue determines that the registers were 90% or 100% full, it may decide that it is operating in a congested mode.

In a second example, the transaction queue may determine that a congestion event has occurred based on measured latency of the external bus. As is known, agents typically operate according to a predetermined bus protocol. The bus protocol may establish rules governing when new requests may be posted on the external bus and which of possibly many agents may post a new request on the bus for each request "slot," each opportunity to post a new request on the bus. In such an embodiment, the transaction queue 300 may measure a number of request slots that pass before the transaction queue 300 acquires ownership of the bus. If the measured number of slots exceeds some predetermined threshold, the transaction queue 300 may determine that a congestion event has occurred.

According to another embodiment, the transaction queue 300 may respond to a congestion event differently depending upon a type of congestion that is detected. Consider an example where the transaction queue can detect the two types of triggering events described above: 1) that the number of available registers drops below some threshold number (say, the transaction queue is entirely full), and 2) that measured latency on the external bus exceeds a threshold amount. According to an embodiment, the transaction queue 300 may invalidate all prefetch requests when the transaction queue 300 is entirely full but it may invalidate only the blind prefetch requests when the measured latency on the external bus exceeds the threshold. This embodiment may be advantageous because it provides for a simple implementation and distinguishes between congestion events of low and high severity.

The preceding discussion has distinguished among pending and posted requests. Herein, a posted request is one that has begun on the external bus. Typically, an external bus is defined by a predetermined bus protocol, one that specifies incremental stages that a transaction undergoes toward completion. The congestion management methods described in the foregoing embodiments do not disturb transactions that have been posted. By contrast, a pending request is one that is stored within the BSU but has not begun on the external bus. The congestion management methods of the present invention may invalidate pending requests according to those techniques described in the foregoing embodiments.

As shown above, embodiments of the present invention provide a transaction queue 300 that may operate according to a dynamic priority scheme. A first priority scheme may be defined for the transaction queue in the absence of congestion. But when congestion is detected, the transaction queue may implement a second priority scheme. In the embodiments described above, the transaction queue may invalidate prefetch requests.

The congestion management techniques described in the foregoing embodiments are directed to read requests that are processed by transaction management systems. As is known, a BSU may process other types of requests, such as write requests, that are not intended to cause data to be read into an agent. The congestion management techniques described in the foregoing embodiments are not intended to disturb the methods by which a transaction management system processes these other types of requests.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A transaction queue for an agent operative according to a dynamic priority scheme, the transaction queue operating initially according to a default priority scheme and then engaging a second priority scheme to invalidate selected stored transactions when the transaction queue becomes congested.

2. The transaction queue of claim 1, wherein the second priority scheme invalidates a stored non-posted blind prefetch request.

3. The transaction queue of claim 1, wherein the second priority scheme invalidates a stored non-posted prefetch request that is associated with a posted prefetch request.

4. The transaction queue of claim 1, wherein the second priority scheme invalidates a stored non-posted patterned prefetch request.

5. The transaction queue of claim 1, wherein the agent is a general purpose processor.

6. The transaction queue of claim 1, wherein the agent is a memory controller.

7. A method for managing transactions for an agent, comprising:
receiving a first transaction;
if a transaction queue is congested, identifying a second transaction having a lower priority than the first transaction,
removing the second transaction from the transaction queue, and
storing the first transaction in the transaction queue.

8. The method of claim 7, wherein the transaction queue is congested whenever a latency of stored transactions exceeds a predetermined threshold.

9. The method of claim 7, wherein the transaction queue is congested whenever a number of stored transactions exceeds a predetermined threshold.

10. The method of claim 7, wherein the transaction queue is congested whenever the transaction queue becomes full.

11. The method of claim 7, wherein the first transaction is a core read request and the second transaction is a patterned prefetch request or a blind prefetch request.

12. The method of claim 7, wherein the first transaction is a patterned prefetch request and the second transaction is a blind prefetch request.

13. A transaction queue, comprising:
an arbiter; and
a plurality of queue registers coupled to the arbiter, each queue register to store data representing a stored bus transaction, each queue register having an address field and a status field;
wherein, responsive to a congestion event, the arbiter invalidates a selected stored bus transaction.

14. The transaction queue of claim 13, wherein the congestion event occurs whenever a new bus transaction is received by the arbiter and a number of stored bus transactions exceeds a predetermined threshold.

15. The transaction queue of claim 13, wherein the controller invalidates the selected stored bus transaction by modifying the status field in a queue register corresponding to the selected stored bus transaction.

16. The transaction queue of claim 13, wherein the selected stored bus transaction is a blind prefetch request.

17. The transaction queue of 13, wherein, when there are no valid blind prefetch requests in the transaction queue, the selected stored bus transaction is a patterned prefetch request.

18. A system for managing external bus transactions, comprising:
an agent;
an arbiter coupled to the agent, the arbiter operative to store external bus transactions according to a default priority scheme, the arbiter operative according to a second priority scheme in response to a congestion event;
an internal cache coupled to the arbiter;
a transaction queue coupled to the arbiter, the transaction queue storing the external bus transactions;
an external bus controller coupled to the transaction queue; and
a memory subsystem coupled to the external bus controller through an external bus.

19. The system of claim 18,
wherein the default priority scheme prioritizes core read requests over prefetch requests and the prefetch requests over write requests; and
wherein the second priority scheme prioritizes the core read requests over the write requests and the write requests over the prefetch requests.

20. The system of claim 18, wherein the congestion event occurs whenever a new external bus transaction is received by the arbiter and a number of stored external bus transactions exceeds a predetermined threshold.

21. The system of claim 18, wherein the congestion event occurs whenever a new external bus transaction is received by the arbiter and a latency of stored transactions exceeds a predetermined threshold.

22. The system of claim 18, wherein the agent is a general purpose processor.

23. The system of claim 18, wherein the agent is a memory controller.

24. The system of claim 18, wherein the agent is a prefetch queue.

25. A system, comprising:
a memory system,
an agent coupled to the memory by an external bus, the agent to generate read or write transactions on the bus addressing locations within the memory system, the agent comprising a transaction management system including a queue to store core read requests and prefetch requests, the transaction management system responsive to a congestion event by invalidating non-posted prefetch requests.

26. The system of claim 25, wherein the transaction management system invalidates data of a transaction after data responsive to the transaction is read by the agent.

27. The system of claim 25, wherein the transaction management system comprises a queue having a plurality of entries, each entry to store data of at least two transactions, including a first field representing whether the respective transaction is a core read request or a patterned prefetch request, and a second field representing whether the respective transaction is pending or has been posted on the external bus.

28. A method, comprising:
storing within an agent data representing a plurality of transactions to be conducted external to the agent, the transactions including core read requests, patterned prefetch requests and blind prefetch requests,
storing within the agent data representing a status of the transactions, including whether the respective transactions are pending and whether the respective transaction are in progress externally from the agent, and
responsive to a congestion event, invalidating pending blind prefetch requests that have not been posted externally.

29. The method of claim 28, further comprising, responsive to another congestion event, invalidating pending patterned prefetch requests that have not been posted externally.

30. The method of claim 28, further comprising, posting the transactions externally according to a priority scheme that prioritizes core read requests over patterned pre fetch requests and patterned prefetch requests over blind prefetch requests.

31. The method of claim 28, wherein the invalidating comprises changing the status of the pending blind prefetch request to indicate that it has been completed.

* * * * *